US007828419B2

(12) United States Patent
Ikegame et al.

(10) Patent No.: US 7,828,419 B2
(45) Date of Patent: Nov. 9, 2010

(54) INK JET RECORDING HEAD AND METHOD OF MANUFACTURING THE SAME

(75) Inventors: Ken Ikegame, Atsugi (JP); Shuji Koyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 529 days.

(21) Appl. No.: 11/860,330

(22) Filed: Sep. 24, 2007

(65) Prior Publication Data

US 2008/0074470 A1 Mar. 27, 2008

(30) Foreign Application Priority Data

Sep. 25, 2006 (JP) ............................ 2006-258680

(51) Int. Cl.
*B41J 2/135* (2006.01)
*G01D 15/00* (2006.01)
*G11B 5/127* (2006.01)

(52) U.S. Cl. .............................. 347/64; 347/65; 216/27

(58) Field of Classification Search .................. 347/64, 347/65

See application file for complete search history.

(56) References Cited

U.S. PATENT DOCUMENTS

| | | | | |
|---|---|---|---|---|
| 6,137,510 | A | 10/2000 | Sato et al. | |
| 6,540,335 | B2 | 4/2003 | Touge et al. | |
| 7,066,581 | B2 * | 6/2006 | Conta et al. | 347/65 |

* cited by examiner

*Primary Examiner*—Uyen-Chau N Le
*Assistant Examiner*—Kajli Prince
(74) *Attorney, Agent, or Firm*—Canon USA Inc IP Div

(57) ABSTRACT

An ink jet recording head includes a substrate having a plurality of energy-generating elements that generate energy for discharging ink droplets and an ink supply port extending in a direction in which the energy-generating elements are arranged, a plurality of discharge ports that are provided correspondingly to the energy-generating elements, a discharge-port-forming member provided on the substrate and including a plurality of ink passages that include the energy-generating elements and connect the supply port and each of the discharge ports, and a rib provided on a surface of the discharge-port-forming member opposite the supply port and extending in a direction in which the energy-generating elements are arranged. A surface of the rib opposite the supply port has a protective layer.

8 Claims, 4 Drawing Sheets

INK JET RECORDING HEAD AND METHOD OF MANUFACTURING THE SAME

BACKGROUND OF THE INVENTION

1. Field of the Invention

The present invention relates to an ink jet recording head in which recording is performed by ejecting ink to form flying droplets, and a method of manufacturing the same.

2. Description of the Related Art

An ink jet recording head of the present invention can be applied to apparatuses for performing recording on a recording medium, such as printers, copiers, facsimiles having a communication system, word processors having a printer unit, and to industrial recording apparatuses made up of a combination of various processing apparatuses. Recording media on which the ink jet recording head of the invention can perform recording include papers, threads, fibers, textiles, leathers, metals, plastics, glasses, timbers, ceramics, and the like.

"Recording" in the invention means performance of recording on a recording medium of not only an image having a particular meaning such as a character or a figure but also an image having no particular meaning such as a pattern or the like.

3. Related Background Art

In recent ink jet recording heads, droplets of a discharged ink have become smaller and discharge ports have been distributed at a higher density in order to achieve recording with a higher image quality. There is a known technique in which elements such as an electrothermal transducer and a drive circuit therefor are provided in a board by means of a semiconductor manufacturing technique and an electrical control circuit (diode matrix circuit or shift register circuit) is built into a recording head. In an ink jet recording head manufactured by such a technique, ink is supplied to a plurality of discharge ports arranged in a line. The recording head has a through-cavity (hereinafter referred to as "supply port") extending from the back surface of a substrate in a direction in which the electrothermal transducers are arranged, in communication with ink passages, thereby supplying ink from the common supply port to the individual discharge ports.

U.S. Pat. Nos. 6,540,335 and 6,137,510 disclose an ink jet recording head in which a supply port has a rib for suppressing the occurrence of residual bubbles and reinforcing a discharge-port-forming member to increase the strength thereof. Such an ink jet recording head having a rib is manufactured through the following steps:

(1) a step of forming an etch stop layer on a substrate surface having electrothermal transducers;

(2) a step of forming a back etching mask, functioning as a mask when forming a supply port, on the other surface not having the electrothermal transducers;

(3) a step of forming a pattern of ink passages and a rib on the substrate by using a layer of dissoluble resin;

(4) a step of forming a coating resin layer on the dissoluble resin layer;

(5) a step of forming discharge ports in the coating resin layer;

(6) a step of forming a supply port in the substrate;

(7) a step of removing the back etching mask;

(8) a step of removing the etch stop layer formed on the substrate; and (9) a step of removing the dissoluble resin layer.

In the above ink jet recording head, the supply port is formed by chemically etching the substrate. More specifically, a supply port is formed by using a silicon substrate as the substrate and performing anisotropic etching with an etchant composed of a strong alkaline solution such as potassium hydroxide, sodium hydroxide, and tetramethylammonium hydroxide. In order to prevent the contact between the etchant and the coating resin layer, the etch stop layer is provided on the substrate by using a substance, such as silicon nitride, that is not easily dissolved by the etchant.

The etch stop layer is typically provided over a stepped portion in the surface of the silicon substrate. The etch stop layer is often slightly thinner at the stepped portion. Further, because of constraints and the like in a deposition apparatus, the thickness of the etch stop layer may vary in a single silicon substrate. With the variation in thickness of the etch stop layer or the like, when the silicon substrate is dissolved and the etch stop layer is exposed in the anisotropic etching step, a stress may be applied onto the etch stop layer itself resulting in the etch stop layer becoming irregularly cracked.

The substrate is typically covered with a native silicon oxide film. The native oxide film provided on the back surface of the substrate is to be removed by treatment with hydrofluoric acid after the anisotropic etching step. In that case, etching on regions where the etch stop layer is thinner, such as a stepped portion, may progress faster to expose the surface of the substrate.

After the above-described steps, a removal step by means of dry etching is performed in order to remove the back etching mask provided for forming the supply port. If the removal step is performed when there is a crack in the etch stop layer, an etching gas may enter into the substrate through the crack and erode the coating resin layer on the rib, leading to formation of irregular undulations.

If an ink jet recording head is manufactured in the above state, residual bubbles may stay at the eroded portion upon discharge thereby causing discharge failure due to incapability of supplying ink. Moreover, because of the irregular undulations formed on the rib, the discharge-port-forming member may be deformed so as to be incapable of maintaining sufficient strength to resist an applied external force, leading to an adverse effect on ink discharge. Such an external force is applied when a protective tape provided over the discharge-port-forming member is stripped in the process of distribution or when a suction cap or a wiping blade is brought into contact with the discharge-port-forming member during a recovery operation or the like.

In keeping pace with the increasing image quality of recorded images produced by ink jet recording heads in recent years, the number of discharge ports and the discharge port distribution density have increased, the length of lines of discharge ports has increased, the size of discharged ink droplets has decreased, and the number of colors thereof has increased. This has increased the number of wires to be connected to electrothermal transducers and the number of circuits required for more complicated drive control, resulting in an increase in substrate size. In order to address such a problem, a circuit can be configured, without increasing the size of a substrate, by increasing the number of wiring layers to be stacked on the substrate. In either case, however, the cost of manufacturing the recording head becomes high.

SUMMARY OF THE INVENTION

The present invention is directed to an ink jet recording head capable of preventing deformation of a discharge-port-forming member due to an external force and occurrence of recording failure due to residual bubbles.

The present invention is also directed to an ink jet recording head capable of increasing the image quality of recorded images without increasing the size of a substrate and with a low manufacturing cost.

An ink jet recording head according to an aspect of the present invention includes a substrate having a plurality of energy-generating elements that generate energy for discharging ink droplets and an ink supply port extending in a direction in which the energy-generating elements are arranged, a plurality of discharge ports that are provided correspondingly to the energy-generating elements, a discharge-port-forming member provided on the substrate and including a plurality of ink passages that include the energy-generating elements and connect the supply port and each of the discharge ports, and a rib provided on a surface of the discharge-port-forming member opposite the supply port and extending in a direction in which the energy-generating elements are arranged. In this ink jet recording head, a surface of the rib opposite the supply port has a protective layer.

Further, a wire can be provided between the protective layer and the rib.

According to the invention, an ink jet recording head capable of preventing occurrence of recording failure due to residual bubbles and deformation of a discharge-port-forming member due to an external force can be manufactured.

Further, by employing a structure having a wire between the protective layer and the rib, an ink jet recording head capable of increasing the image quality of recorded images without increasing the size of a substrate and with a low manufacturing cost.

Further features of the present invention will become apparent from the following description of exemplary embodiments (with reference to the attached drawings).

DESCRIPTION OF THE EMBODIMENTS

Embodiments of the present invention will now be described with reference to the attached drawings.

Numerical values described in each of the following embodiments are only examples and do not limit the invention. The invention is not limited to the following embodiments and may be a combination thereof. The invention can be applied to other techniques to be included in the scope of the invention described in the appended claims.

First Embodiment

Figure 1:
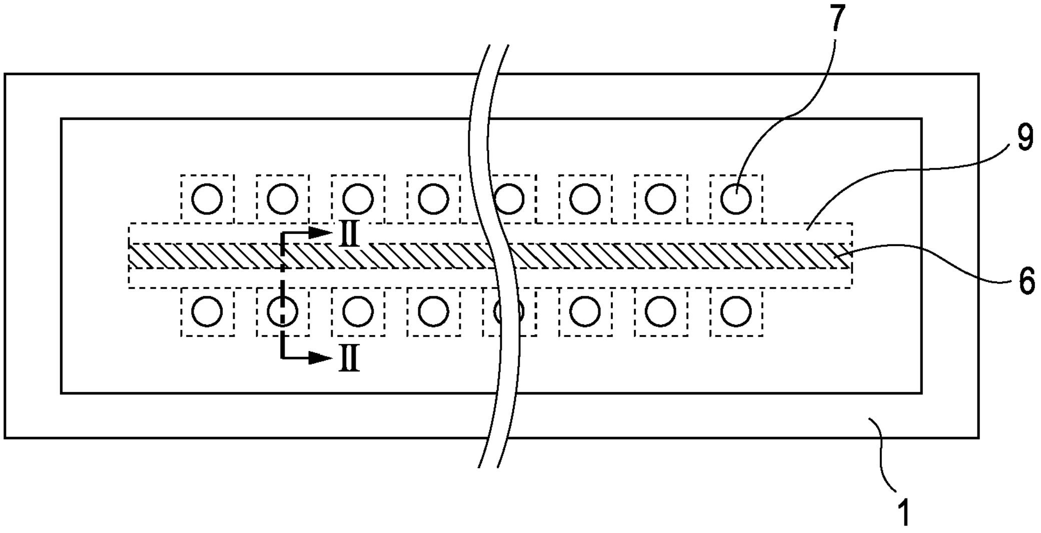
FIG. 1 is a schematic top view of an ink jet recording head according to a first embodiment of the present invention.
Figure 2:
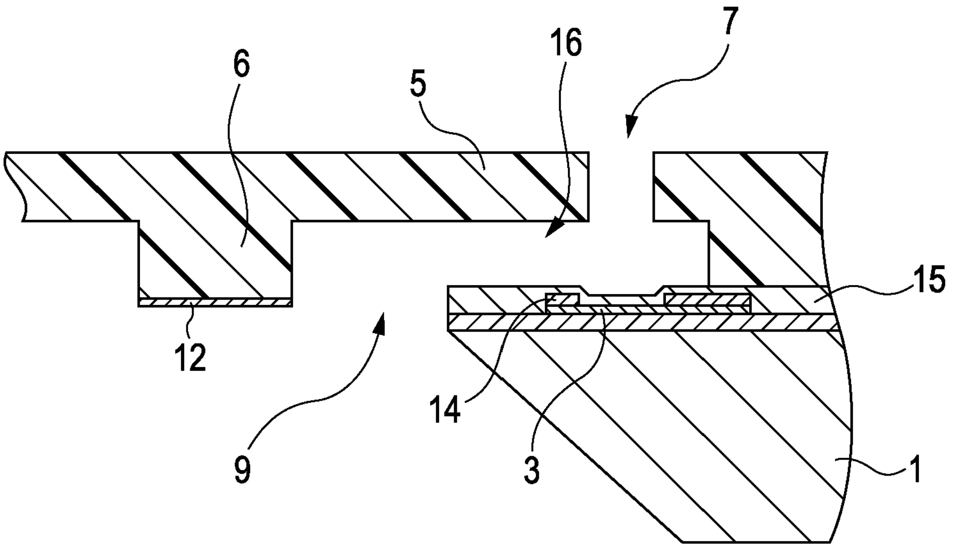
FIG. 2 is a partial enlarged sectional view of the ink jet recording head shown in FIG. 1, taken along line II-II.

FIG. 1 is a schematic top view of an ink jet recording head according to a first embodiment of the invention. FIG. 2 is a partial enlarged sectional view of the ink jet recording head shown in FIG. 1, taken along line II-II.

The ink jet recording head of the first embodiment includes a substrate 1, on the top surface of which a plurality of electrothermal transducers 3 are provided as energy-generating elements that generate energy for discharging ink droplets, and a discharge-port-forming member 5 provided over the substrate 1. The electrothermal transducers 3 are connected to wires 14 for supplying the electrothermal transducers 3 with power for heating the electrothermal transducers 3. The electrothermal transducers 3 and the wires 14 are covered with and protected by a protective layer 15 provided on the substrate 1.

The discharge-port-forming member 5 has discharge ports 7 at positions facing the respective electrothermal transducers 3. The substrate 1 also has a supply port 9 extending in a direction in which the energy-generating elements are arranged. Between the substrate 1 and the discharge-port-forming member 5, a plurality of ink passages 16 are formed for making the supply port 9 and the individual discharge ports 7 communicate with each other. The discharge-port-forming member 5 has a rib 6 on the surface facing the supply port 9. The rib 6 is provided at a position facing the supply port 9 and extends along the supply port 9 extending in the longitudinal direction of the substrate 1 (see FIG. 1).

FIGS. 3A to 3E illustrate steps of manufacturing the ink jet recording head shown in FIG. 1. The steps of manufacturing the ink jet recording head of the first embodiment will now be described with reference to FIGS. 3A to 3E.

Figure 3A:
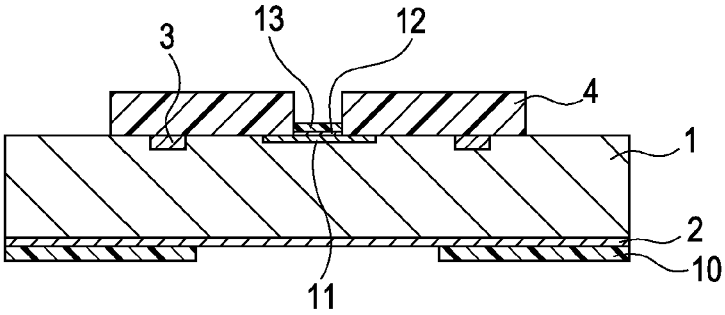
FIGS. 3A to 3E illustrate steps of manufacturing the ink jet recording head shown in FIG. 1.
Figure 3B:
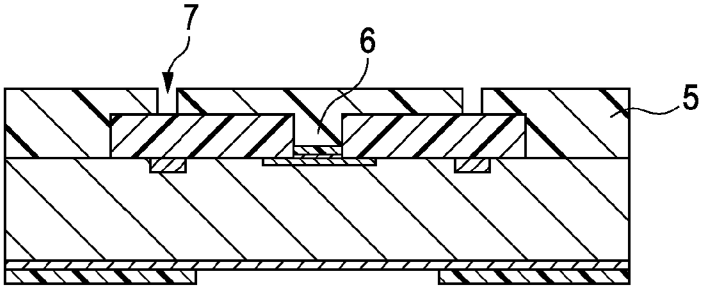

Referring to FIG. 3A, the first embodiment employs, as the substrate 1, a silicon substrate whose surface has a crystal orientation of (100). The electrothermal transducers 3, a plurality of wires 14 (not shown) for driving the electrothermal transducers 3, the protective layer 15 (not shown) therefor, and a drive circuit (not shown) are formed on the substrate 1 by using a semiconductor manufacturing technique. Further, an etch stop layer 11, which is an anti-etching mask for anisotropic etching, is formed on the substrate 1 at a position at which an opening for the supply port 9 will be later formed, by using a photolithographic technique. Generally, the etch stop layer 11 includes a single layer or a plurality of layers containing silicon oxide ($SiO_2$) or silicon nitride (SiN). The etch stop layer 11 of the first embodiment is made up of two types of silicon nitride films including a 200-nm-thick silicon nitride film formed by low-pressure chemical vapor deposition and a 300-nm-thick silicon nitride film formed by plasma chemical vapor deposition.

Next, a protective layer 12 is formed on the etch stop layer 11 in a region where the rib 6 is to be formed. The protective layer 12 is formed by photolithographic patterning such that all region except the region to be sandwiched between the rib 6 and the etch stop layer 11 are removed. The protective layer 12 is formed by using tantalum to have a thickness of 200 nm.

Next, in order to drive the electrothermal transducers 3, an electrode pad (not shown) used for connection with an external control apparatus (not shown) for supplying power to the substrate 1 is formed on the substrate 1. A method of forming the electrode pad is not particularly limited.

In the above step, in order to strengthen the bond between the substrate 1, the protective layer 12 thereon, and the discharge-port-forming member 5, an adhesion-improving layer 13 can be formed on the protective layer 12 according to need. In the first embodiment, the adhesion-improving layer 13 is formed by photolithographic patterning using a thermoplastic resin as a material. An etching mask 10 is formed as a mask to be used for anisotropic etching performed in a subsequent step on a surface of the substrate 1 opposite the surface on which the discharge-port-forming member 5 is to be formed, by means of a photolithographic technique. The material for the etching mask 10 is the same as that for the adhesion-improving layer 13. Since the substrate 1 has an oxide film 2 on the surface thereof not facing the discharge-port-forming member 5, the etching mask 10 is formed over the oxide film 2.

Next, a resin material to become a resin layer 4 constituting pattern-forming materials corresponding to the portions to become the ink passages 16 is applied on the substrate 1 by using a spinner so that the resin layer 4 has a thickness of 15 μm equivalent to the height of the ink passages 16. Subsequently, a pattern constituting the ink passages 16 and the rib 6 is formed in the resin layer 4 by means of a photolithographic technique. In the first embodiment, the resin material employed for the resin layer 4 is a positive photoresist dissoluble in a stripping agent (removing solution) for a positive photoresist. Although in the first embodiment a spinner is used for applying the resin material for the resin layer 4, other techniques such as one utilizing a bar coater may also be used. Next, referring to FIG. 3B, a resin material to become the discharge-port-forming member 5 is applied on the substrate 1 so as to cover the resin layer 4, and the discharge-port-forming member 5 including the discharge ports 7 is formed by means of a photolithographic technique. In this step, bond between the protective layer 12 or the adhesion-improving layer 13 and the discharge-port-forming member 5 is established. When providing the discharge-port-forming member 5, the portion to become the rib 6 and the portion to become the surface plate including the discharge ports 7 may be formed separately. For example, the portion to become the rib 6 may be formed first and then the surface plate including the discharge ports 7 may be formed thereon. Another possible method for providing the discharge-port-forming member 5 is such that the discharge-port-forming member 5 preliminarily provided with the protective layer 12 on the rib 6 thereof is mounted on the substrate 1 so as to obtain a structure shown in FIG. 3B. In this case, the resin layer 4 as pattern-forming materials shown in the figure is not particularly required.

In the first embodiment, a photosensitive cationically polymerizable epoxy resin is employed as a resin material for the discharge-port-forming member 5. Other possible materials for the discharge-port-forming member 5 include photosensitive epoxy resin, photosensitive acrylic resin, and the like. However, since the discharge-port-forming member 5 is always in contact with ink, the following need to be taken into consideration when selecting the material to be employed.

(1) Even if the discharge-port-forming member 5 comes into contact with ink, no impurities should be eluted from the discharge-port-forming member 5 into the ink.

(2) The discharge-port-forming member 5 should desirably adhere to the silicon substrate 1 and not become separated from the substrate 1 due to changes with time.

In view of the above, a cationic polymer compound formed by photoreaction is considered to be suitable as a material for the discharge-port-forming member 5. However, the material suitable for the discharge-port-forming member 5 may vary widely according to the type of ink to be used. Therefore, the material is not necessarily limited to the one mentioned above and any material may be selected according to need.

In addition, a water-repellent layer, not employed in the first embodiment, may be formed on the surface of the discharge-port-forming member 5. Such a layer prevents adhesion of ink around the discharge port and consequently prevents changes in ink-discharging direction due to the adhered ink, thereby enabling a stable performance of ink discharge.

Figure 3C:
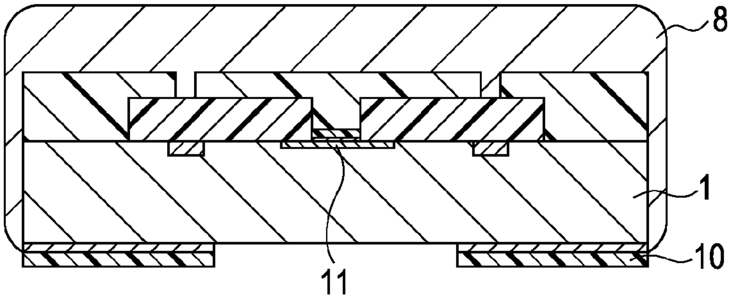

Next, referring to FIG. 3C, the substrate 1 is covered with an etch protection material 8, except for a surface having the etching mask 10. The etch protection material 8 is used for protecting the surface of the discharge-port-forming member 5 from an etchant when the supply port 9 is formed in the substrate 1 by means of anisotropic etching in the subsequent step. Then, the substrate 1 is chemically etched by using a tetramethylammonium hydroxide (TMAH) solution as an anisotropic etchant so as to form the supply port 9 in the substrate 1.

Figure 3D:
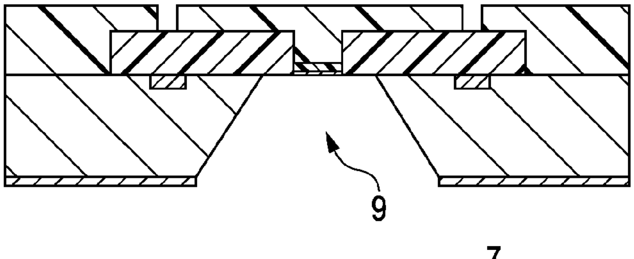

Next, the etch protection layer 8 is removed from the substrate 1 that had undergone the anisotropic etching. Further, the etching mask 10 and the etch stop layer 11 respectively formed on the bottom and top surfaces of the substrate 1 are removed by means of dry etching. Since the etching speed for thermoplastic resin, the material for the etching mask 10, is higher than that for tantalum, the material for the protective layer 12, the etching mask 10 is easier to be dry-etched. In addition, silicon nitride, the material for the etch stop layer 11, can be dry-etched more easily than tantalum, the material for the protective layer 12. Therefore, even when the etching mask 10 and the etch stop layer 11 are completely removed, the protective layer 12 remains unremoved on the underside of the rib 6. As a result, a structure shown in FIG. 3D is obtained.

Figure 3E:
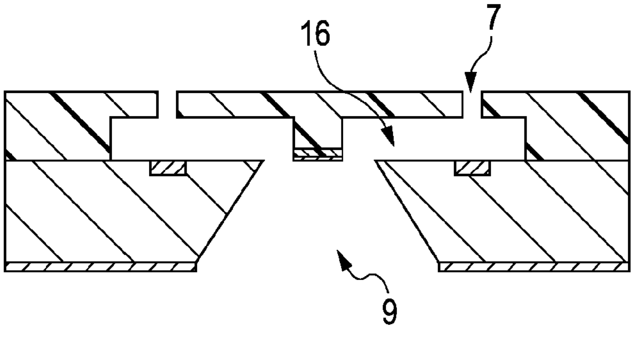
Figure 4A:
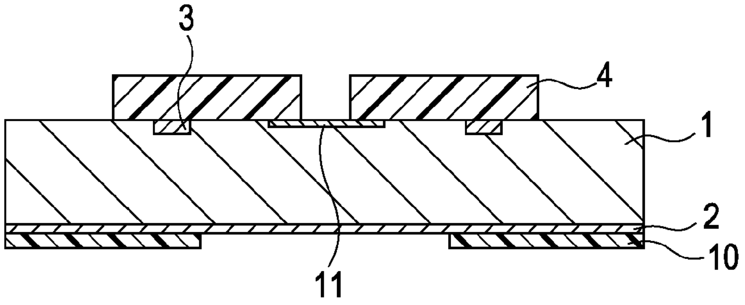
FIGS. 4A to 4E illustrate steps of manufacturing an ink jet recording head made as a comparative example to the first embodiment.
Figure 4B:
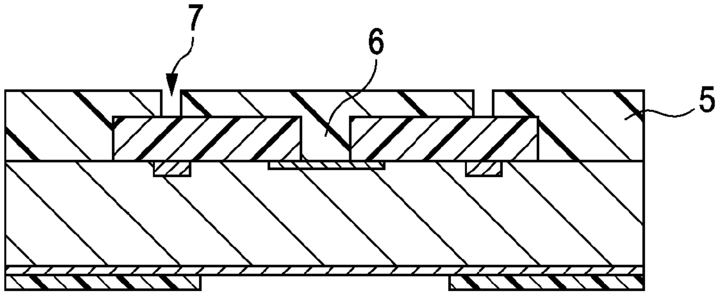
Figure 4C:
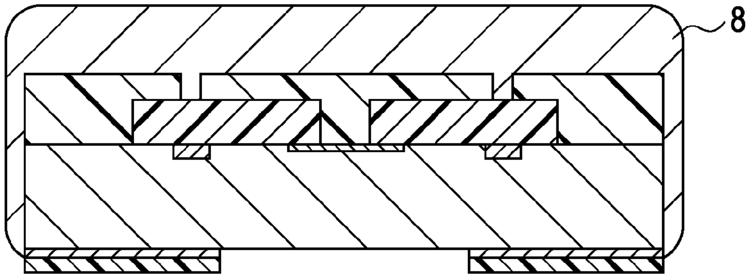
Figure 4D:
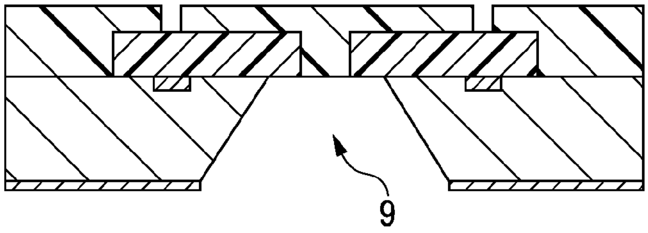
Figure 4E:
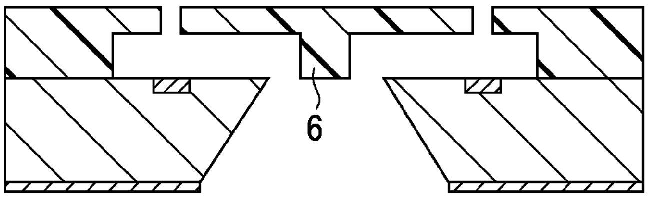

Subsequently, as shown in FIG. 3E, the top surface of the discharge-port-forming member 5 is exposed so as to make the resin layer 4, made of a positive photoresist, to be in a soluble state, and the resin layer 4 is removed by using a pattern-forming-material removing solution (a stripping agent for positive photoresist). By removing the resin layer 4, the ink passages 16 and the rib 6 are formed in the discharge-port-forming member 5. In this manner, a passage connecting the supply port 9 and the discharge ports 7 through the ink passages 16 is formed, whereby the principal structure of the ink jet recording head is established.

The discharge ports 7 of the first embodiment are symmetrically arranged on both sides of the supply port 9 at, for example, a pitch of 600 dots per inch (dpi). However, the arrangement of the discharge ports 7 is not limited thereto. The discharge ports may be arranged at nonuniform pitches, disposed only on one side of the supply port, or disposed asymmetrically on both sides of the supply port. Moreover, a plurality of supply ports may be provided in a single substrate.

In an example of the ink jet recording head manufactured according to the above-mentioned steps, the rib 6 was formed in a desirable manner without any cracks in the protective layer 12 provided on the underside of the rib 6. Even after implementation of a test in which the ink jet recording head was left for three months immersed in ink at a constant temperature of 60° C., no separation of the protective layer 12 was observed and recording operation by the ink jet recording head was performed in a desirable manner.

Comparative Example

FIGS. 4A to 4E illustrate steps of manufacturing an ink jet recording head made as a comparative example to the first embodiment. The comparative example is the same as the example of the first embodiment except that each of the ink jet recording heads did not have the protective layer 12 and the adhesion-improving layer 13 on the underside of the rib 6.

In the comparative example, about five percent of the ink jet recording heads that had undergone the anisotropic etching step for forming the supply port 9 in the substrate 1 had some cracks in the etch stop layer 11 in a region in contact with the rib 6. Moreover, after subsequent steps, undulations were formed on the rib 6 in a region in contact with the cracked region of the etch stop layer 11. When the supply port 9 of the ink jet recording head having undulations on the rib 6 was observed while ink discharge was performed, bubbles stayed at the undulations and caused ink discharge failure.

Second Embodiment

Figure 5:
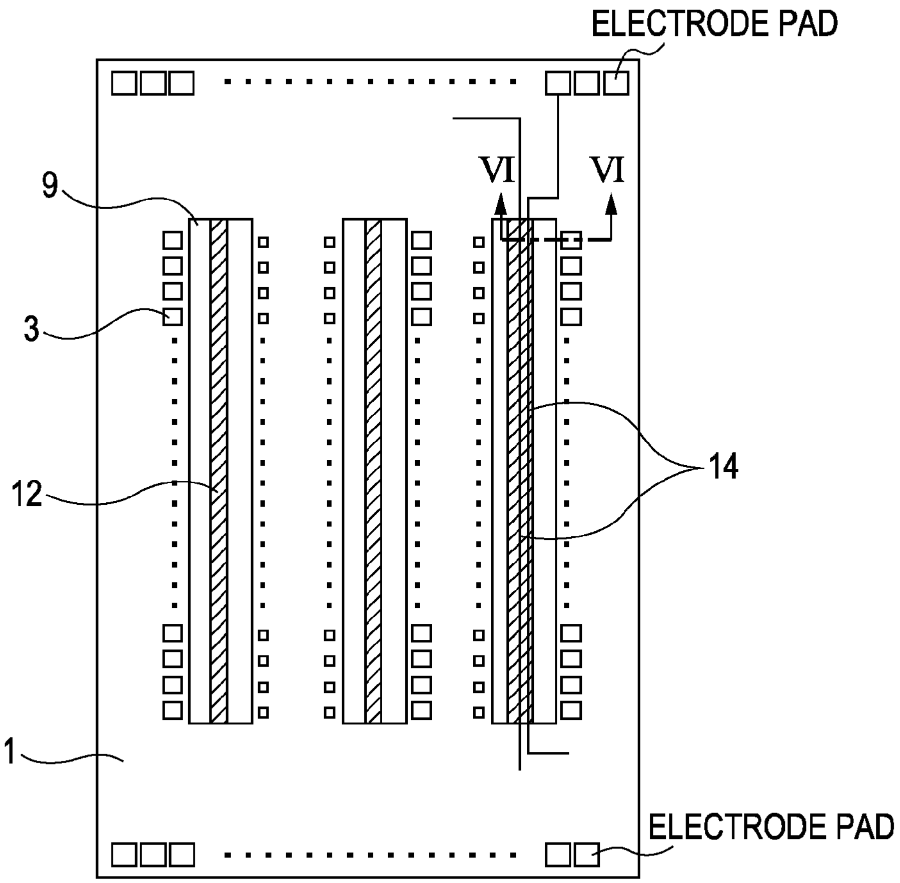
FIG. 5 is a schematic top view of an ink jet recording head according to a second embodiment of the present invention.
Figure 6:
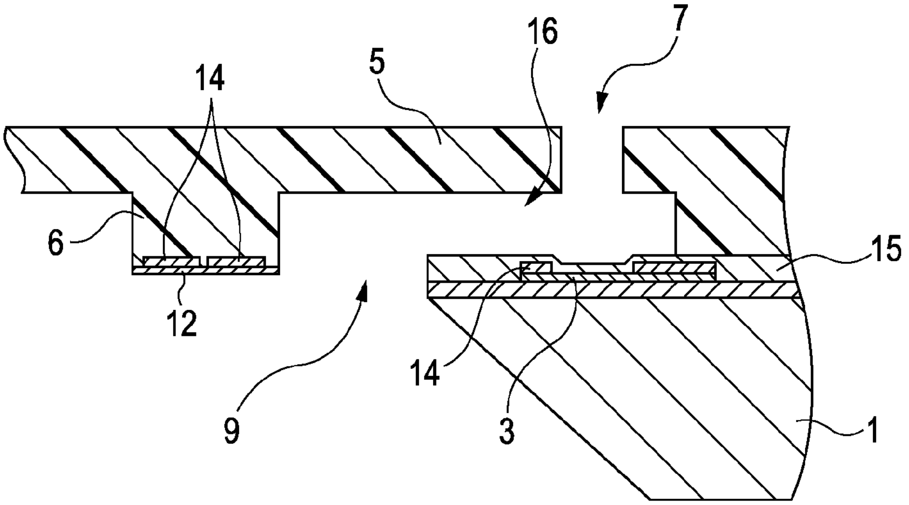
FIG. 6 is a partial enlarged sectional view of the ink jet recording head shown in FIG. 5, taken along line VI-VI.

FIG. 5 is a schematic top view of an ink jet recording head according to a second embodiment of the present invention, and FIG. 6 is a partial enlarged sectional view of the ink jet recording head shown in FIG. 5, taken along line VI-VI.

In the second embodiment, wires 14 to be connected to the electrothermal transducers 3 are provided between the rib 6 and the protective layer 12. The wires 14 are formed on the protective layer 12 in the step described above with reference to FIG. 3A, after forming the protective layer 12, by using a semiconductor manufacturing process. The other steps of manufacturing the ink jet recording head of the second embodiment are the same as those in the first embodiment described above with reference to FIGS. 3A to 3E.

In an example of the ink jet recording head of the second embodiment, the rib 6 was formed in a desirable manner without any cracks in the protective layer 12 provided on the underside of the rib 6. Even after implementation of a test in which the ink jet recording head was left for three months immersed in ink at a constant temperature of 60° C., no separation of the protective layer 12 was observed and recording operation by the ink jet recording head was performed in a desirable manner.

When the protective layer 12 is composed of tantalum, the tantalum, whose surface is oxidized upon contact with ink, turns to $Ta_2O_5$ having anti-corrosiveness against ink. In some cases, tantalum is used as a cavitation protection film (not shown) for protecting the electrothermal transducers 3 from impacts due to foaming and defoaming of ink. In such a case, the protective layer 12 may be formed simultaneously with the cavitation protection film, whereby the protective layer 12 can be formed without performing an extra film-forming step on the substrate 1.

According to the second embodiment, because the wires 14 are provided between the rib 6 and the protective layer 12, the number of the wires 14 to be formed on the substrate 1 can be increased at a low manufacturing cost without increasing the size of the substrate 1 or the number of wiring layers stacked on the substrate 1. Even when the exemplary recording head was operated by transmitting a signal through the wires 14 formed on the rib 6, the ink jet recording head was properly operated without a malfunction. Moreover, no separation of the protective layer 12 was observed after the aforementioned test, and no failures such as a short circuit of the wires 14 formed on the rib 6 occurred.

Although in the second embodiment an example in which two wires 14 were formed on the rib 6 has been described, the number of the wires 14 to be formed is not limited thereto but may be more. Further, although in the second embodiment the protective layer 12 and the wires 14 are provided as separate components, the protective layer 12 itself may function as the wire.

Although in the second embodiment the wires 14 formed on the rib 6 are data lines for transmitting a drive signal to the electrothermal transducers 3, the function of the wires 14 formed on the rib 6 is not limited thereto. For example, the wires 14 may function as a temperature sensor or a sub-heater for controlling ink viscosity or the like.

Usually, ink has a viscosity which varies with temperature. In the case of an ink jet recording head, the characteristic of ink discharge often changes according to ink viscosity. Particularly, the characteristic of ink discharge often changes in a transition from a state where ink discharge operation is continuously performed to another state where the first discharge of ink is performed after a long absence of ink discharge operation. In order to solve this problem, a measure in which the temperature of ink in the recording head is detected and the recording head is driven according to the detected temperature, for example, is taken. When a temperature sensor is provided at the rib 6, the temperature of ink in the recording head can be measured directly, whereby information on ink temperature can be correctly reflected in accordance with various drive conditions. When a sub-heater is provided at the rib 6, the ink supplied into the recording head can be directly heated by the sub-heater, whereby responsiveness of heat transfer from the sub-heater to the ink is improved. Therefore, the ink can be kept warm with less drive energy than in the case of providing the sub-heater at another location.

Although in the second embodiment electrode pads are provided on both ends of the substrate 1, electrode pads may be provided only on one end of the substrate 1 having supply ports 9 of the same length.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-258680 filed Sep. 25, 2006, which is hereby incorporated by reference herein in its entirety.

What is claimed is:

1. An ink jet recording head comprising:

a substrate having a plurality of energy-generating elements that generate energy for discharging ink droplets and an ink supply port extending in a direction in which the energy-generating elements are arranged;

a plurality of discharge ports that are provided correspondingly to the energy-generating elements;

a discharge-port-forming member provided on the substrate and including a plurality of ink passages that include the energy-generating elements and connect the supply port and each of the discharge ports; and a rib provided on a surface of the discharge-port-forming member opposite the supply port and extending in a direction in which the energy-generating elements are arranged, wherein a surface of the rib opposite the supply port has a protective layer comprising a metal atom.

2. The ink jet recording head according to claim 1, wherein the protective layer is formed of a material having anti-corrosiveness against an etchant used in anisotropic etching for forming the supply port in the substrate.

3. The ink jet recording head according to claim 1, wherein the protective layer includes a plurality of layers.

4. The ink jet recording head according to claim 1, further comprising a wire electrically connected with the plurality of energy-generating elements provided between the protective layer and the rib.

5. The ink jet recording head according to claim 1, further comprising an adhesion-improving layer strengthening bond between the protective layer and the rib provided between the protective layer and the rib.

6. The ink jet recording head according to claim 1, wherein the adhesion-improving layer includes a resin having alkali resistance.

7. The ink jet recording head according to claim 1, wherein the protective layer comprises tantalum.

8. An ink jet recording head comprising:

a substrate having a plurality of energy-generating elements that generate energy for discharging ink droplets and an ink supply port extending in a direction in which the energy-generating elements are arranged;

a plurality of discharge ports that is provided correspondingly to the energy-generating elements;

a discharge-port-forming member provided on the substrate and including a plurality of ink passages that includes the energy-generating elements and connects the supply port and each of the discharge ports; and a rib provided on a surface of the discharge-port-forming member opposite the supply port and extending in a direction in which the energy-generating elements are arranged, wherein a surface of the rib opposite the supply port has a protective layer, and a wire electrically connected with the plurality of energy-generating elements provided between the protective layer and the rib.

* * * * *